United States Patent [19]

Kobayashi

[11] Patent Number: 4,577,252

[45] Date of Patent: * Mar. 18, 1986

[54] WORD LINE NUMBER COUNT/DISPLAY DEVICE FOR TAPE RECORDER

[75] Inventor: Minoru Kobayashi, Tokyo, Japan

[73] Assignee: Olympus Optical Co., Ltd., Tokyo, Japan

[ * ] Notice: The portion of the term of this patent subsequent to Aug. 17, 1999 has been disclaimed.

[21] Appl. No.: 390,556

[22] Filed: Jun. 21, 1982

Related U.S. Application Data

[63] Continuation-in-part of Ser. No. 161,316, Jun. 20, 1980, Pat. No. 4,345,287.

[30] Foreign Application Priority Data

Jun. 26, 1979 [JP]  Japan ................................. 54-80334

[51] Int. Cl.$^4$ ............................................. G11B 5/008
[52] U.S. Cl. ..................................... 360/137; 360/72.2
[58] Field of Search ................... 360/137, 31, 72.1–73, 360/69; 346/20; 235/132 R, 132 A, 132 E

[56] References Cited

U.S. PATENT DOCUMENTS

| | | | |
|---|---|---|---|
| 3,869,720 | 3/1975 | Ohira et al. ............................. | 360/72 |
| 3,986,004 | 10/1976 | Whitney .................................. | 360/72 |
| 4,044,233 | 8/1977 | Sato ....................................... | 360/137 |
| 4,140,896 | 2/1979 | Robertson ............................. | 360/137 |
| 4,167,787 | 9/1979 | Satoh et al. ............................ | 360/137 |
| 4,172,231 | 10/1979 | D'Alayer de Costemore D'Arc et al. ......................................... | 360/137 |
| 4,208,686 | 6/1980 | Sato et al. ............................. | 360/137 |
| 4,214,282 | 7/1980 | Sato et al. ............................. | 360/137 |
| 4,217,615 | 8/1980 | Suzuki .................................. | 360/137 |
| 4,343,039 | 8/1982 | Smith, Jr. et al. ................... | 360/72.2 |

*Primary Examiner*—John H. Wolff
*Assistant Examiner*—David J. Severin
*Attorney, Agent, or Firm*—Frishauf, Holtz, Goodman & Woodward

[57] ABSTRACT

A word line number count/display device used in a tape recorder for dictation includes a magnetic head for detecting a special cue signal from a magnetic recording tape while the tape is running in either of two opposite directions, and for generating a detection signal corresponding to the length of a main communication content of dictation recorded on the tape. A time measuring circuit electrically connected to the magnetic head measures the time length corresponding to the length of the main communication content and generates a time period signal corresponding to the measured time length. A dividing circuit electrically connected to the time measuring circuit divides the time period signal by a predetermined reference time period value to produce a quotient signal, and a multiplying circuit multiplies the quotient signal by a predetermined value corresponding to the average number of words spoken by a dictator during a predetermined period of time divided by the average number of words contained in one line of a typing paper. A resulting product signal is provided to a decoder which produces a digital signal corresponding to the product signal from the multiplying circuit. A digital display device displays digital information corresponding to the digital signal.

10 Claims, 7 Drawing Figures

WORD LINE NUMBER COUNT/DISPLAY DEVICE FOR TAPE RECORDER

CROSS-REFERENCE TO RELATED APPLICATION

This application is a continuation-in-part of application Ser. No. 161,316, filed on June 20, 1980, now issued as U.S. Pat. No. 4,345,287 on Aug. 17, 1982.

BACKGROUND OF THE INVENTION

This invention relates to a word line number count/display device, which is used with a tape recorder for dictation using a multi-channel magnetic head, and counts and displays the number of word lines of the essential portion or main communication content of dictated information recorded on a magnetic recording tape.

In the prior-art tape recorder for dictation using a multi-channel magnetic head, at the time of recording, a message containing a remark or the like regarding the main communication content is recorded before the recording of the main communication content which is the essential portion of the dictation. Also, at the time of the recording, a first cue signal is recorded on the tape immediately before the recording of the message, and also a second cue signal different from the first cue signal is recorded on the tape immediately before and after the recording of the main communication content for the purpose of facilitating discrimination between the message and main communication content at playback. At this time, the message and main communication content are recorded on the magnetic recording tape by one of two magnetic heads or a first magnetic head of the multi-channel magnetic head, while the first and second cue signals are recorded on the tape by the other or a second magnetic head of the multi-channel magnetic head.

During playback of the tape, on which the message and main communication content as well as the first and second cue signals are recorded in the above way, the first and second cue signals are reproduced by the second magnetic head while the message and main communication content are reproduced by the first magnetic head. With the prior-art tape recorder, however, the number of words of the main communication content cannot be told before the typing operation. Therefore, it is impossible to know before the typing operation the number of word lines which are required for typing the main communication content on a typing sheet having a predetermined width. This means that it sometimes happens that it is found after the typing operation that it is impossible to write a signature on the sheet where the last portion of the main communication content is typed, so that the signature alone has to be written on a separate sheet. Also it sometimes happens that the signature has to be written on a sheet where only the last few lines of the main communication portion is typed.

SUMMARY OF THE INVENTION

An object of the invention is to provide a word line number count/display device, which is used for a tape recorder for dictation having a multi-channel magnetic head and counts and displays the number of word lines of the main communication content recorded on a magnetic recording tape.

The above object of the invention is obtained by a word line number count/display device which is used in a tape recorder including a multi-channel magnetic head having a plurality of magnetic heads, drive means for running a magnetic recording tape in one or the other direction, first recording means connected to one of the magnetic heads in the multi-channel magnetic head, for recording the main communication content of a dictation and a message regarding the main communication content on the magnetic recording tape when the magnetic recording tape is run in the one direction, and second recording means connected to another one of the magnetic heads in the multi-channel magnetic head, for recording a signal corresponding to the length of the main communication content on the magnetic recording tape as the main communication content is being recorded with the running of the magnetic recording tape in the one direction, and which comprises:

detecting means for detecting the signal from the magnetic recording tape while the magnetic recording tape is running in one or the other direction and for generating a detection signal corresponding to the length of the main communication content;

time measuring circuit means electrically connected to the detecting means, for measuring the time length corresponding to the length of the main communication content by receiving the detection signal and for generating a time period signal corresponding to the measured time length;

dividing circuit means electrically connected to the time measuring circuit means, for dividing the time period signal from the time measuring circuit means by a predetermined reference value corresponding to a predetermined period of time to produce a quotient signal corresponding to the quotient of division;

multiplying circuit means electrically connected to the dividing circuit means, for multiplying the quotient signal from the dividing circuit means by a predetermined value obtained by dividing the average number of words spoken by a dictator during a predetermined period of time by the average number of words contained in one line of a typing paper to produce a product signal corresponding to the product of multiplication;

a decoder electrically connected to the multiplying circuit means, for producing a digital signal corresponding to the product signal from the multiplying circuit means; and digital display means electrically connected to the decoder, for displaying digital information corresponding to the digital signal.

The word line number count/display device stated above may be so constructed that the second recording means records a first cue signal on the magnetic recording tape running in the one direction immediately before the recording of the message, records a second cue signal different from the first cue signal on the magnetic recording tape running in the one direction immediately before the recording of the main communication content and records a third cue signal different from the first cue signal on the magnetic recording tape running in one direction immediately after the recording of the main communication content; the detecting means detects the first and second cue signals from the magnetic recording tape running in either the one or the other direction to produce detection signals corresponding to the first and second cue signals; and the time measuring circuit means measures the period of time elapsed from the instant of reception of the detection signal corresponding to either the second or third cue signal till the instant of reception of the detection signal corresponding to the other one of the second and third signals to produce a time period signal corresponding to the measured time length.

At this time, the second cue signal may be identical with the third cue signal.

It is preferable that the second recording means records a first cue signal on the magnetic recording tape running in the one direction immediately before the recording of the message, records a second cue signal different from the first cue signal on the magnetic recording tape running in the one direction immediately before the recording of the main communication content and records a third cue signal different from the first and second cue signals on the magnetic recording tape running in one direction immediately after the recording of the main communication content; the detecting means reads out the second and third cue signals from the magnetic recording tape when the tape is running in the one direction to produce detection signals corresponding to the second cue signal first read out, and second and third cue signals read out subsequent to the first read-out second cue signal, from the instant when the first read-out second cue signal is read out; the detecting means also reads out the third and second cue signals from the magnetic recording tape when the magnetic recording tape is running in the other direction to produce detection signals corresponding to the third cue signal first read out, and third and second cue signals read out subsequent to the first read-out third cue signal, when the first read-out third cue signal is read out; and the time measuring circuit means measures the period of time elapsed from the instant of reception of the detection signal corresponding to the second or third cue signal till the instant of reception of the detection signal corresponding to the other one of the second and third cue signals.

With such arrangement, only the number of the word lines corresponding to the message is not counted and displayed when the supply of electricity to the tape recorder 10 is stopped during playbacks of the main communication content. That is, only the number of the word lines corresponding to the main communication content is counted and displayed.

It is preferable that the detecting means includes a magnetic head. With such arrangement, the construction of the detecting means may be simplified. Further, it is preferable that the dividing circuit means includes reference value setting means for setting the predetermined reference value corresponding to the predetermined period of time.

With such arrangement, the reference value may be changed. The predetermined value as denominator in the dividing circuit means may be one minute.

With such arrangement, constructions of the dividing circuit means and multiplying circuit means may be simplified.

It is preferable that setting means be provided for setting the average number of words spoken by a dictator in the predetermined period of time, and for setting the average number of words contained in one line of typing paper.

With such arrangement, the average number of words spoken by a dictator in the predetermined period of time may be changed, should a different person start to dictate.

It is preferable that the decoder include permutation circuit means electrically connected to the digital display means, for causing the display of the digital information on the digital display means in a predetermined order conforming to the order of arrival of the information at the digital display means from the decoder when the magnetic recording tape is moved in the one direction, and also causing the display of the digital information on the digital display means in the order converse to the predetermined order conforming to the order of arrival of the information at the digital display means from the decoder when the magnetic recording tape is moved in the other direction.

DETAILED DESCRIPTION OF THE PREFERRED EMBODIMENTS

Figure 1:
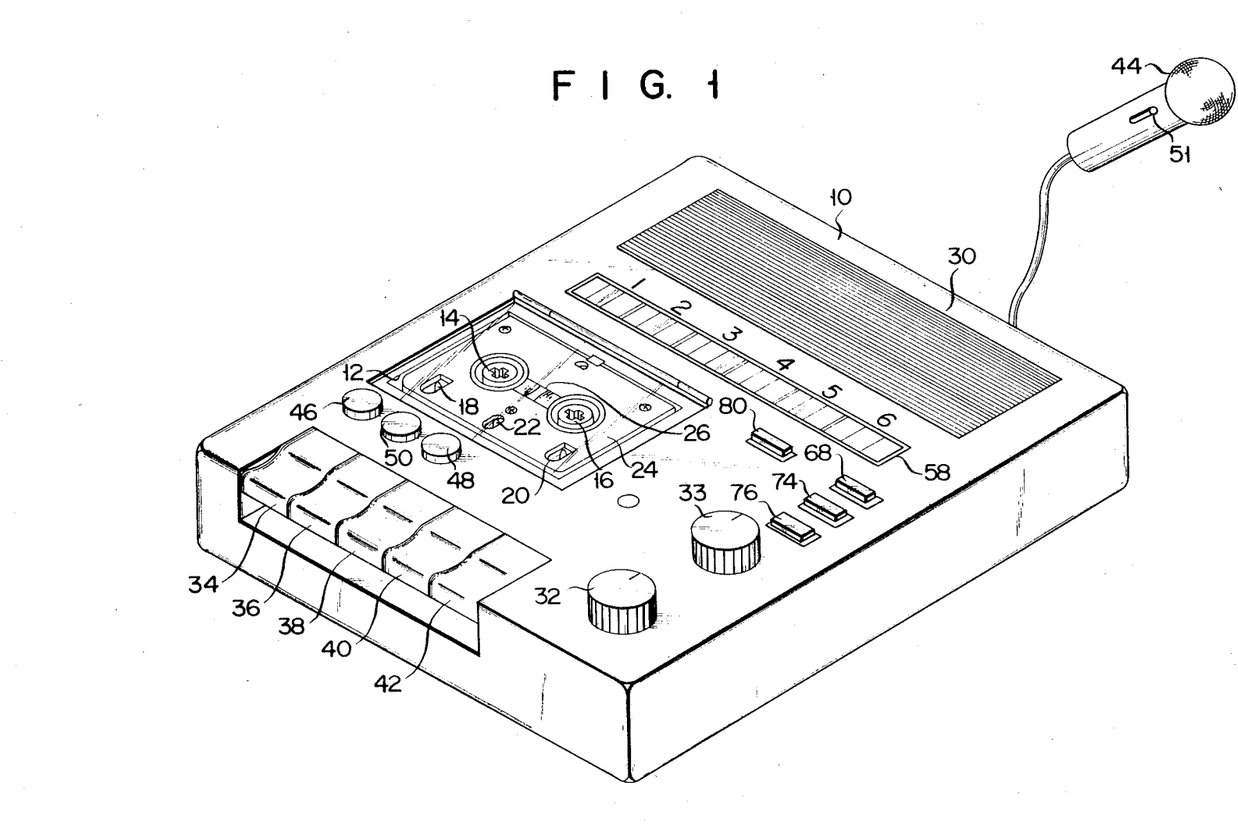
FIG. 1 is a perspective view showing a tape recorder for dictation provided with a first embodiment of the word line number count/display device according to the invention.

FIG. 1 shows a tape recorder 10 for dictation provided with a word line number count/display device according to a first embodiment of the invention. The tape recorder 10 is provided at its top with a tape cassette loading section 12. In the tape cassette loading section 12, a pair of reel shafts 14 and 16, a pair of cassette positioning pins 18 and 20 and a capstan 22 project from its bottom.

A tape cassette 24 is loaded in a tape cassette loading section 12. The pair reel shafts 14 and 16 project through respective reel hubs provided in the housing of the tape cassette 24. The cassette positioning pins 18 and 20 and capstan 22 respectively project through cassette positioning pin holes and a capstan hole formed in the housing of the tape cassette 24.

In the housing of the tape cassette 24, a magnetic recording tape 26 is wound on the pair of reel hubs. The cassette loading section 12 is provided in its side wall with an opening (not shown), in which a multi-channel magnetic head (not shown), a pinch roller (not shown) and a magnetic head for erasure (not shown) are provided. In this embodiment, the multi-channel magnetic head includes two magnetic heads. The tape cassette loading section 12 is covered by a tape cassette lid.

The tape recorder 10 is also provided at its top with a loudspeaker 30, a volume control knob 32 for controlling the volume of the sound reproduced from the loudspeaker 30 and a tone control knob 33 for controlling the tone of the reproduced sound. The top of the tape recorder 10 is further provided with a stop/eject button 34, a forward play button 36, a record button 38, a fast forward.cue button 40 and a rewind.cue button 42.

When the forward play.cue button 36 is depressed, the multi-channel magnetic head and pinch roller are brought into contact with the magnetic recording tape 26 accommodated in the tape cassette 24 loaded in the tape cassette loading section 12. The magnetic recording tape 26 is driven in a predetermined direction at a constant speed by the pinch roller and capstan 22 and the pair of reel shafts 14 and 16. At this time, one of the magnetic heads in the multi-channel magnetic head converts magnetic signals which have been recorded on the magnetic recording tape 26 into electric signals, which are coupled to the loudspeaker 30.

When the record button 38 is depressed together with the forward play button 36, the magnetic head for erasure is brought into contact with the tape 26, while the aforementioned one magnetic head in the multi-channel magnetic head converts electric signals from a microphone 44 into magnetic signals and records them on the tape 26 which is driven in the predetermined direction at the constant speed.

When the fast forward.cue button 40 is depressed, the pinch roller and magnetic head for erasure are separated from the tape 26, and the multi-channel magnetic head alone is left in contact with the tape 26. At this time, the tape 26 is driven in the aforementioned predetermined direction and at a speed faster than the aforementioned constant speed by the pair of reel shafts 14 and 16. Also, the aforementioned one magnetic head in the multi-channel magnetic head converts magnetic signals which have been recorded on the tape 26 into electric signals and supplies them to the loudspeaker 30.

When the rewind.cue button 42 is depressed, the pinch roller and magnetic head for erasure are separated from the tape 26, and only the multi-channel magnetic head is held in contact with the tape 26. At this time, the tape 26 is driven in the direction opposite to the aforementioned predetermined direction at a speed faster than the aforementioned constant speed. Also, the aforementioned one magnetic head in the multi-channel magnetic head converts magnetic signals which have been recorded on the tape 26 into electric signals and supplies them to the loudspeaker 30.

When the stop/eject button 34 is depressed after the forward play button 36, or the forward play button 36 and record button 38, or the fast forward.cue button 40, or the rewind.cue button 42 is or are depressed, the pinch roller, magnetic head for erasure and multi-channel magnetic head are separated from the tape 26. At this time, the tape 26 is also stopped. When the stop/eject button 34 is depressed once again, that is, when it is depressed twice in succession, the cassette lid is brought to its open position, and the tape cassette 24 is ejected from the tape cassette loading section 12.

The top of the tape recorder 10 is further provided with first and second cue signal addition buttons 46 and 48, and a pause button 50.

When the first cue signal addition button 46 is depressed after the forward play button 36 and record button 38 are depressed, the other magnetic head in the multi-channel magnetic head records a first cue signal at a first predetermined frequency, 60 Hz in this embodiment, on the tape 26.

When the second cue signal addition button 48 is depressed after the forward play button 36 and record button 38 are depressed, the other magnetic head in the multi-channel magnetic head records a second or third cue signal at a second predetermined frequency, 120 Hz in this embodiment, on the tape 26.

When the pause button 50 is depressed after the forward play button 36, or the forward play button 36 and record button 38, or the fast forward.cue button 40, or the rewind.cue button 42 is or are depressed, the tape 26 is stopped while the pinch roller and multi-channel magnetic head, or the pinch roller, multi-channel magnetic head and magnetic head for erasing remain in contact with the tape 26. The microphone 44 is provided with an auxiliary pause button 51 which has the same function as the pause button 50 only when the microphone 44 is coupled to the tape recorder 10.

The function of the tape recorder 10 will be described in further detail with reference to FIG. 2 which is an enlarged-scale view showing part of the magnetic recording tape 26 accommodated in the tape cassette 24. Designated at 52 in FIG. 2 is the multi-channel magnetic head provided in the tape recorder 10.

The dictator first depresses the forward play button 36 and record button 38 and immediately thereafter depresses the first cue signal addition button 46. At this time, the aforementioned other magnetic head, designated at 54 in FIG. 2, of the multi-channel magnetic head 52 records a first cue signal indicated by symbol "α" on the tape 26 driven in a direction shown by arrow F.FF at the constant speed.

Figure 2:
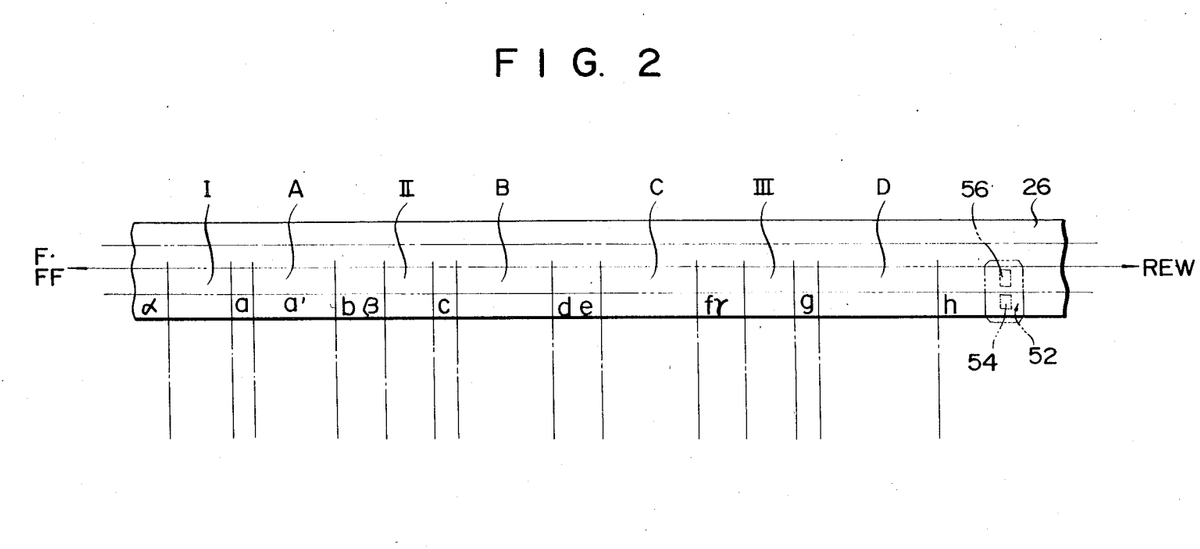
FIG. 2 is an elevational view showing a magnetic recording tape, on which first, second and third cue signals as well as the message and main communication content of letters are recorded using the tape recorder shown in FIG. 1.

When a dictation containing such content as the address of a letter is given to the microphone 44 after depressing the first cue signal addition button 46, it is recorded on a portion of the tape 26 indicated by symbol "I" by the aforementioned one magnetic head, designated at 56 in FIG. 2, of the multi-channel magnetic head 52.

When the dictation is ended, the second cue signal addition button 48 is depressed. At this time, the other magnetic head 54 records a second cue signal indicated by symbol "a" on the tape 26.

When a dictation of, for instance, the main communication content of the first letter is given to the microphone 44 after depressing the second cue signal addition button 48, it is recorded on a portion of the tape 26 indicated by symbol "A" by the head 56.

When the dictation of the main communication content is ended, the second cue signal addition button 48 is depressed. At this time, the other head 54 records a third cue signal indicated by symbol "b" on the tape 26. The frequency of the third cue signal is the same as that of the second cue signal.

The dictator then depresses the first cue signal addition button 46. At this time, the other head 54 records a first cue signal indicated by symbol "β" on the tape 26.

When a dictation, for instance containing an alteration of the aforementioned main communication content or such content as the addresses of second and third letters, is given to the microphone 44, it is recorded on a portion of the tape 26 indicated by symbol "II" by the head 56.

When this dictation is ended, the second cue signal addition button 48 is depressed. At this time, the other head 54 records a second signal indicated by symbol "c" on the tape 26.

When dictation, for instance containing the main communication content of the second letter, is commenced after depressing the second cue signal addition button 48, it is recorded on a portion of the tape 26 indicated by symbol "B" by the head 56.

When this dictation is ended, the second cue signal addition button 48 is depressed. At this time, the other head 54 records a third cue signal indicated by symbol "d" on the tape 26.

Immediately afterwards, the second cue signal addition button 48 is depressed once again. At this time, the other head 54 records the second cue signal indicated by symbol "e" on the tape 26.

When a dictation of the main communication content of the third letter is commenced immediately afterwards, it is recorded on a portion of the tape 26 indicated by symbol "c" by the head 56.

When this dictation is ended, the second cue signal addition button 48 is depressed. At this time, the head 54 records a third cue signal indicated by symbol "f" on the tape 26.

The dictator then depresses the first cue signal addition button 46. At this time, the other head 54 records a first cue signal indicated by symbol "γ" on the tape 26.

When a dictation, for instance containing such content as cancellation of the third letter or the address of a fourth letter, is commenced it is recorded on a portion of the tape 56 indicated by symbol "III" by the head 56.

When this dictation is ended, the second cue signal addition button 48 is depressed. At this time, the other head 54 records a second cue signal indicated by symbol "g" on the tape 26.

When a dictation, for instance containing the main communication content of the fourth letter, is commenced after depressing the second cue signal addition button 48, it is recorded on a portion of the tape 26 indicated by symbol "D" by the head 56.

When this dictation is ended, the second cue signal addition button 48 is depressed. At this time, the other head 54 records a third cue signal indicated by symbol "h" on the tape 26.

The top of the tape recorder 10 is provided with a digital display unit 58 of the word line number count/display device according to the first embodiment of this invention.

The main component parts of the word line number count/display device are accommodated within the housing of the tape recorder 10.

Figure 3:
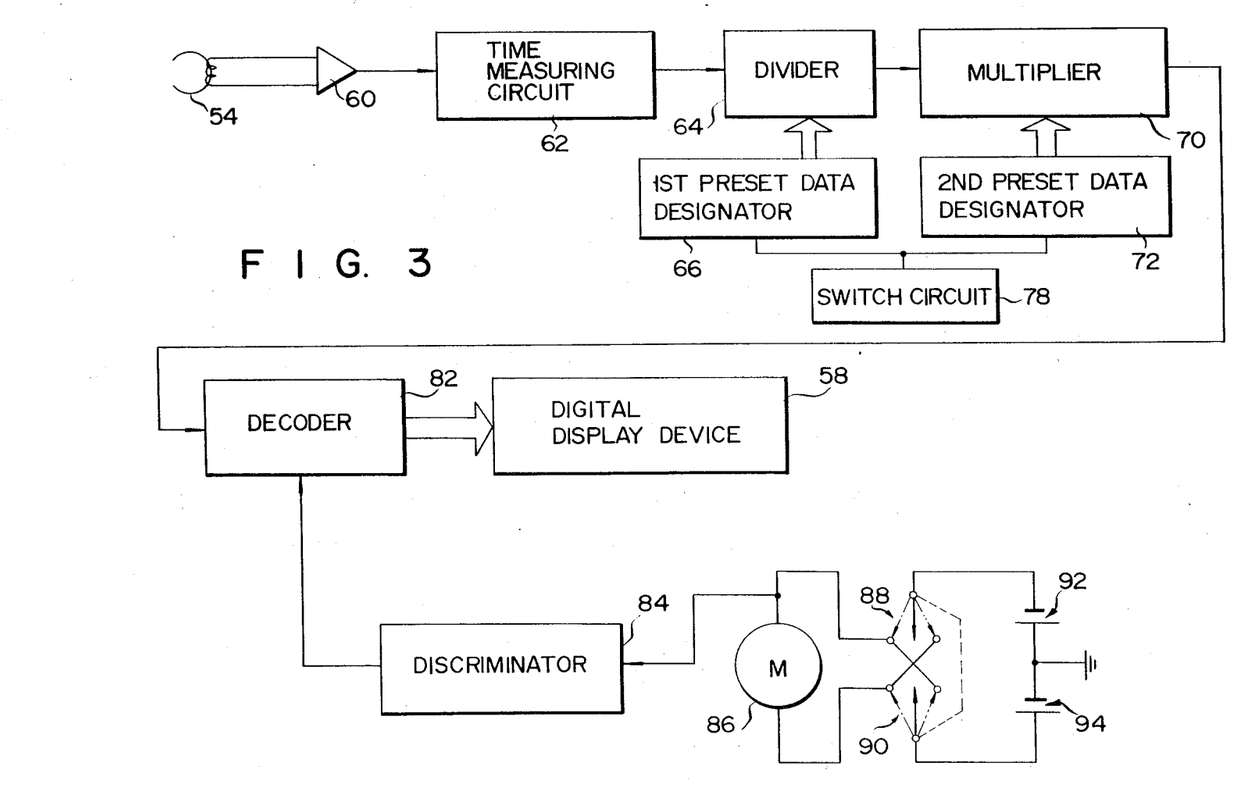
FIG. 3 is a block diagram showing the first embodiment of the word line number count/display device according to the invention.

As shown in FIG. 3, the word line number count/display device is provided with the other magnetic head 54 of the multi-channel magnetic head 52 as a detecting means for detecting the second and third cue signals a, b, c, d, e, f, g and h from the magnetic recording tape 26 and producing detection signals corresponding to the detected second and third cue signals.

The head 52 is electrically connected to an amplifier 60, and when it detects the second and third cue signals it transmits electrical detection signals to the amplifier 60.

The amplifier 60 is electrically connected to a time measuring circuit 62. It measures the period of time elapsed from the reception of an electric signal corresponding to one of the second and third cue signals a, b, c, d, e, f, g and h till the reception of an electrical signal corresponding to another one of the second and third cue signals.

The time measuring circuit 62 is electrically connected to a divider 64. The divider 64 divides the electrical time period signal produced from the time measuring circuit 62 by a predetermined reference value corresponding to a predetermined period of time and produces an electrical quotient signal corresponding to the quotient value.

To the divider 64 is electrically connected a first preset data designator 66 which is a reference value setting means for setting the aforementioned predetermined reference value corresponding to a predetermined period of time.

The first preset data designator 66 includes a time setting button 68 as shown in FIG. 1, provided on the top of the tape recorder 10, for setting the predetermined period of time.

In this embodiment, the predetermined period of time is one minute.

The divider 64 is electrically connected to a multiplier 70. The multiplier 70 multiplies the electrical quotient signal from the divider 64 by a predetermined value, which is the quotient of division of the number of words spoken by the dictator during the aforementioned predetermined period of time by the average number of words contained in one line of the typing paper used by the typist, to produce a product signal corresponding to the result of multiplication.

To the multiplier 70 is electrically connected a second preset data designator 72 which is a value setting means for setting the aforementioned predetermined value. The second preset data designator 72 includes a dictation word number setting button 74 as shown in FIG. 1, provided on the top of the tape recorder 10, for setting the number of words spoken by the dictator during the aforementioned predetermined period of time.

The second preset data designator 72 also includes a typing word number setting button 76 as shown in FIG. 1, provided on the top of the tape recorder 10, for setting the average number of typed words contained in one line of the typing paper used by the typist.

In the instant embodiment, the dictation word number is set to 120, and the average typing word number is set to 50, so that the aforementioned predetermined quotient value is 120/50=2.4.

As shown in FIG. 3, the first and second preset data designators 66 and 72 are electrically connected to a switch circuit 78.

The switch circuit 78 includes a reset button 80 as shown in FIG. 1, provided on the top of the tape recorder 10, for operating the first and second preset data designators 66 and 72.

Thus, the predetermined period of time cannot be set in the first preset data designator 66 by depressing the time setting button 68 unless the reset button 80 has been previously depressed. Also, neither of the dictation word number, i.e., the number of words spoken by the dictator during the aforementioned predetermined period of time and the average typing word number, i.e., the average number of typed words contained in one line of the typing paper used by the typist, can be set in the second preset data designator 72 by depressing the dictation word number setting button 74 or the typing word number setting button 76, unless the reset button 80 has been previously depressed.

Thus, it is possible to prevent the change of the predetermined time period, dictation word number or average typing word number at the time when the time setting button 68, dictation word number setting button 74 or typing word number setting button 76 is depressed by mistake.

As shown in FIG. 3, the multiplier 70 is electrically connected to a decoder 82. The decoder 82 produces a digital signal corresponding to the product signal from the multiplier 70.

The decoder 82 is electrically connected to a digital display device 58 as shown in FIG. 1. In this embodiment, the digital display device 58 has eighteen 7-segment-type LEDs or LCDs. The eighteen LEDs or LCDs form six display units each consisting of three LEDs or LCDs.

In the digital display device 58, one of these display units is used for displaying a digital value corresponding to the digital signal from the decoder 82.

To the decoder 82 is electrically connected a discriminator 84 which is a permutation circuit means. The discriminator 84 is electrically connected to one of a pair of terminals of a DC motor 86, which is provided in the housing of the tape recorder 10 for driving the pair of reel shafts 14 and 16 thereof. The DC motor 86 is rotatable in one and the other direction at a uniform speed and with the same characteristic. Its pair of terminals are electrically connected to respective three-position switches 88 and 90. One of the three-position switches, namely switch 88, is electrically connected to the anode of a first direct current power supply 92, in this embodiment a battery accommodated in the housing of the tape recorder 10. The other three-position switch 90 is electrically connected to the cathode of a second direct current power supply 94, in this embodiment a battery accommodated in the housing of the tape recorder 10. The cathode of the first direct current power supply 92 is electrically connected to the anode of the second power supply 94 and is also grounded. The pair of three-position switches 88 and 90 are mechanically ganged to the stop/eject button 34, forward play button 36, fast forward.cue button 40, rewind.cue button 42, pause button 50 and auxiliary pause button 51 of the tape recorder 10.

The pair of three-position switches 88 and 90 are normally in a first position as shown by solid arrows in FIG. 3. At this time, the DC motor 86 is not supplied with direct current from the first and second direct current power supplies 92 and 94 so that it is not rotated.

When the forward play button 36 or fast forward.cue button 40 is depressed, the pair of three-position switches 88 and 90 are simultaneously brought to a second position as shown by one-dot chain line arrows in FIG. 3. At this time, the DC motor 86 is rotated in one direction at a constant speed to cause rotation of the pair of reel shafts 14 and 16 in one direction at the same time. As a result, the magnetic recording tape 26 is driven in the direction of arrow F.FF in FIG. 2.

When the rewind.cue button 42 is depressed, the pair of three-position switches 88 and 90 are simultaneously brought to a third position as shown by two-dot chain line arrows in FIG. 3. At this time, the DC motor 86 is rotated in the other direction at the constant speed to cause rotation of the pair of reel shafts 14 and 16 at the same time. As a result, the tape 26 is driven in the direction of arrow REW in FIG. 2.

When the pause button 50 or auxiliary pause button 51 is depressed after the forward play button 36, fast forward.cue button 40 or rewind.cue button 42 has been depressed, the pair of three-position switches 88 and 90 are brought from the third or second position to the first position.

The discriminator 84 produces a logic level output corresponding to the potential on one of the terminals of the DC motor 86. The decoder 82 in this embodiment comprises a bilateral shift register, in which the direction of shift is changed according to the logic level output of discriminator 84.

More particularly, when the DC motor 86 is rotated in one direction, i.e., in the direction to drive the magnetic recording tape 26 in the direction of arrow F.FF in FIG. 2, the bilateral shift register supplies digital values from the decoder 82 in the order of their arrival and in a predetermined arrangement to the digital display device 58 for display thereon.

On the other hand, when the DC motor 86 is rotated in the other direction, i.e., in the direction to drive the tape 26 in the direction of arrow REW in FIG. 2, the bilateral shift register supplies digital values from the decoder 82 in the order of their arrival and in an arrangement converse to the aforementioned predetermined arrangement to the digital display device 58 for display thereon.

Figure 4:
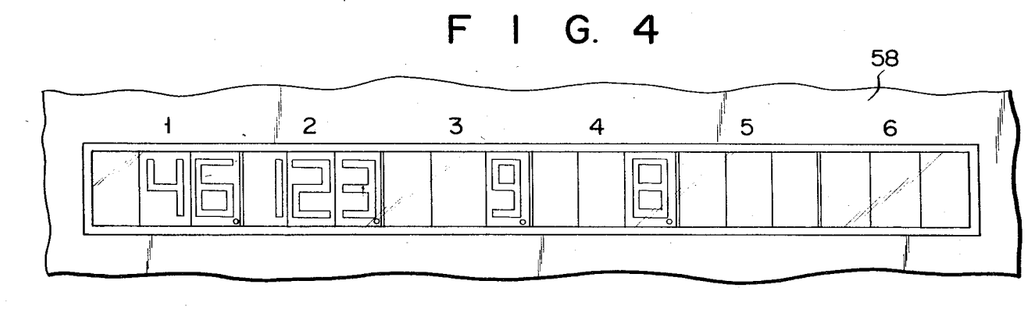
FIG. 4 is an enlarged-scale view showing a digital display device shown in FIG. 1, with numbers of word lines of the main communication content of first to fourth letters, counted by the first embodiment of the word line number count/display device according to the invention from a magnetic recording tape driven in one direction by the tape recorder shown in FIG. 1, being orderly displayed by first to fourth display units of the display device.

With the word line number count/display device embodying the invention as described above, when the magnetic recording tape is driven in the direction of arrow F.FF in FIG. 2, the number of word lines on the typing paper used in typing by the typist, for instance those for the main communication content of the first to fourth letters, is orderly displayed on the digital display device 58, for instance in the first to fourth display units thereof as shown in FIG. 4.

Figure 5:
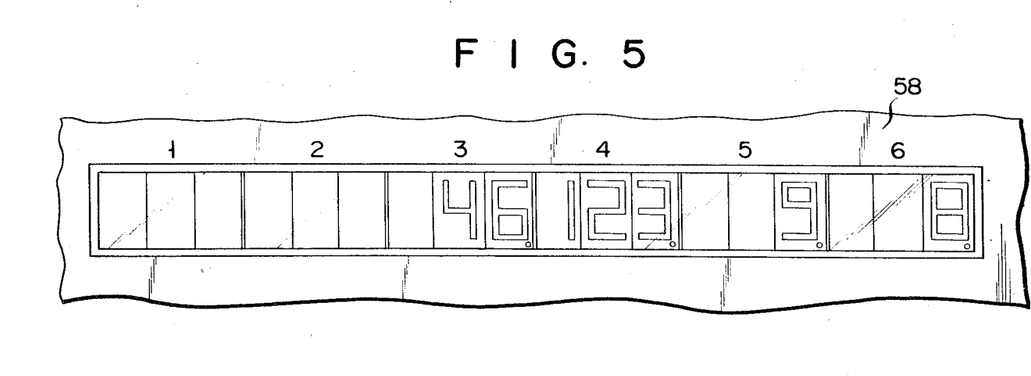
FIG. 5 is a view similar to FIG. 4 but with numbers of word lines of the main communication content of the fourth to first letters, counted by the first embodiment of the word line number count/display device according to the invention from the tape driven in the other direction by the tape recorder of FIG. 1, being orderly displayed by sixth to third display units of the display device.

Also, when the tape is driven in the direction of arrow REW, the number of word lines on the typing paper used by the typist, for instance those for the main communication content of the fourth to first letters, is orderly displayed on the digital display device 58, for instance in the sixth to third display units thereof as shown in FIG. 5.

Suppose now that the supply of electricity to the tape recorder 10 is stopped during playback of one of first to fourth main communication contents "A, B, C, D", for instance the first main communication content "A", in the first embodiment. When the supply of electricity to the tape recorder 19 is resumed, the second magnetic head 54 of the multi-channel magnetic head 52 first detects the third cue signal "b". Then it detects the second cue signal "c" that is recorded immediately before the second main communication content "B". As a result, the word line number count/display device of the first embodiment counts word lines corresponding to the message containing the remarks or the like regarding the main communication content recorded in a portion of the tape shown by reference symbol II. The count of word lines is displayed on the digital display device 58.

Similarly, only word lines corresponding to a nonrecord section intervening between portions designated by reference symbols B and C and corresponding to the message recorded on the portion designated by reference symbols "III" in FIG. 2, are counted. The count of word lines is again displayed on the digital display device 58.

In order to solve the aforementioned problem encountered when the supply of electricity to the tape recorder 10 is stopped during playback of the communication content of one of the first to fourth main communication contents, the second cue signal "a'" as shown in FIG. 2 is recorded by operating the second cue signal addition button 48 before the dictator stops the supply of electricity to the tape recorder 10. When the supply of electricity to the tape recorder 10 is resumed, prior to operating the forward play button 36 for the playback of the first main communication content, the magnetic recording tape 26 is slightly run in the direction of arrow REW by operating the rewind.cue button 42, and the remaining portion of the first main communication content "A" is reproduced by operating the forward play button 36.

In this case, when the supply of electricity to the tape recorder 10 is resumed, the second magnetic head 54 of the multi-channel magnetic head 52 detects the second cue signal "a'" first and then detects the third cue signal "b". The word lines corresponding to the remaining portion of the first main communication content "A" are thus counted, and the count is displayed on the digital display device 58.

Similarly, only the numbers of word lines corresponding to the second, third and fourth main communication contents "B, C, D" are counted and displayed. The word line numbers corresponding to the messages shown by reference symbols II and III in FIG. 2 are neither counted nor displayed.

Now, the second embodiment of the invention will be described.

In the second embodiment, the same parts as those in the first embodiment are designated by the same reference symbols or numerals, and their detailed description is omitted.

Figure 6:
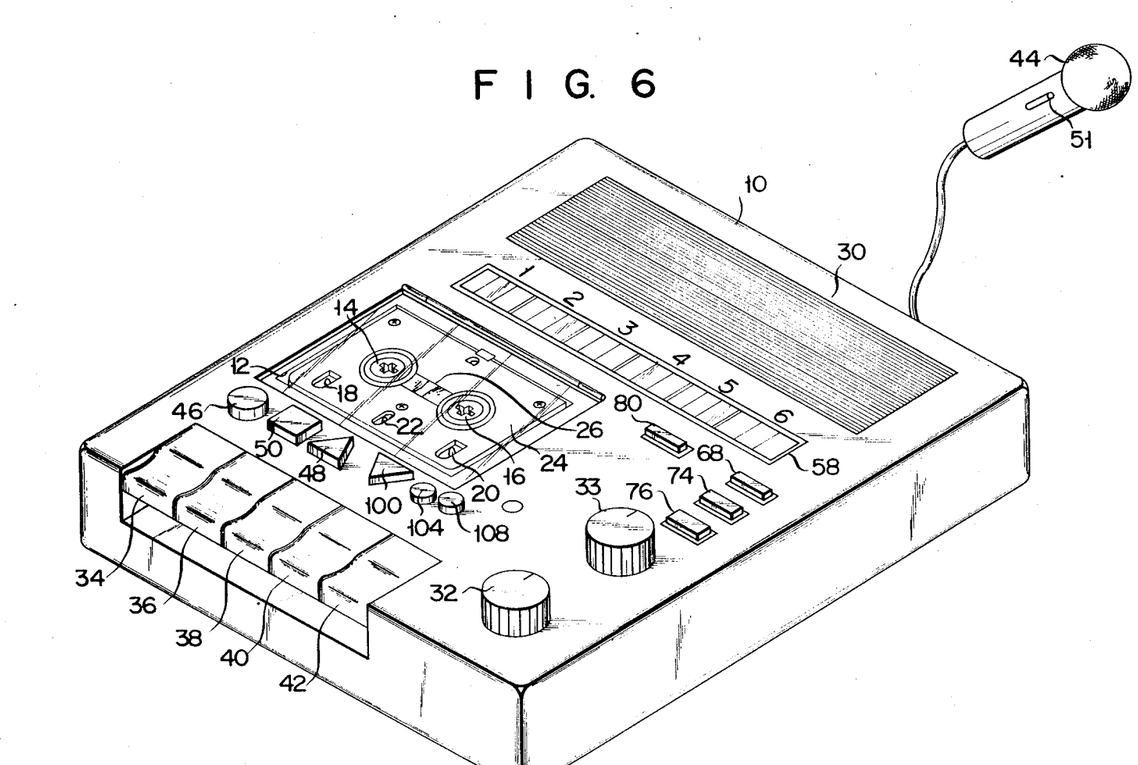
FIG. 6 is a perspective view showing a tape recorder for dictation provided with a second embodiment of the word line number count/display device according to the invention.

In this embodiment, a third cue signal addition button 100 is provided on top of the tape recorder 10.

When the third cue signal addition button 100 is depressed after the forward play button 36 and record button 38 are depressed, the other magnetic head of the multi-channel magnetic head records the third cue signal at a third predetermined frequency on the magnetic recording tape 26.

In this embodiment, the cue signal at a second predetermined frequency generated by the second cue signal addition button 48 is referred to as the second cue signal, and the cue signal at the third predetermined frequency generated by the third cue signal addition button 100 is referred to as the third cue signal.

The frequency of the third cue signal is different from the frequencies of the first and second cue signals.

In this embodiment, immediately after the dictation of each of the first to fourth main communication contents "A, B, C, D" of the letter is ended, the third cue signal addition button 100 is depressed instead of the second cue signal addition button 48, and the third cue signal indicated by symbols "b, d, f and h" is recorded on the magnetic recording tape 26.

Figure 7:
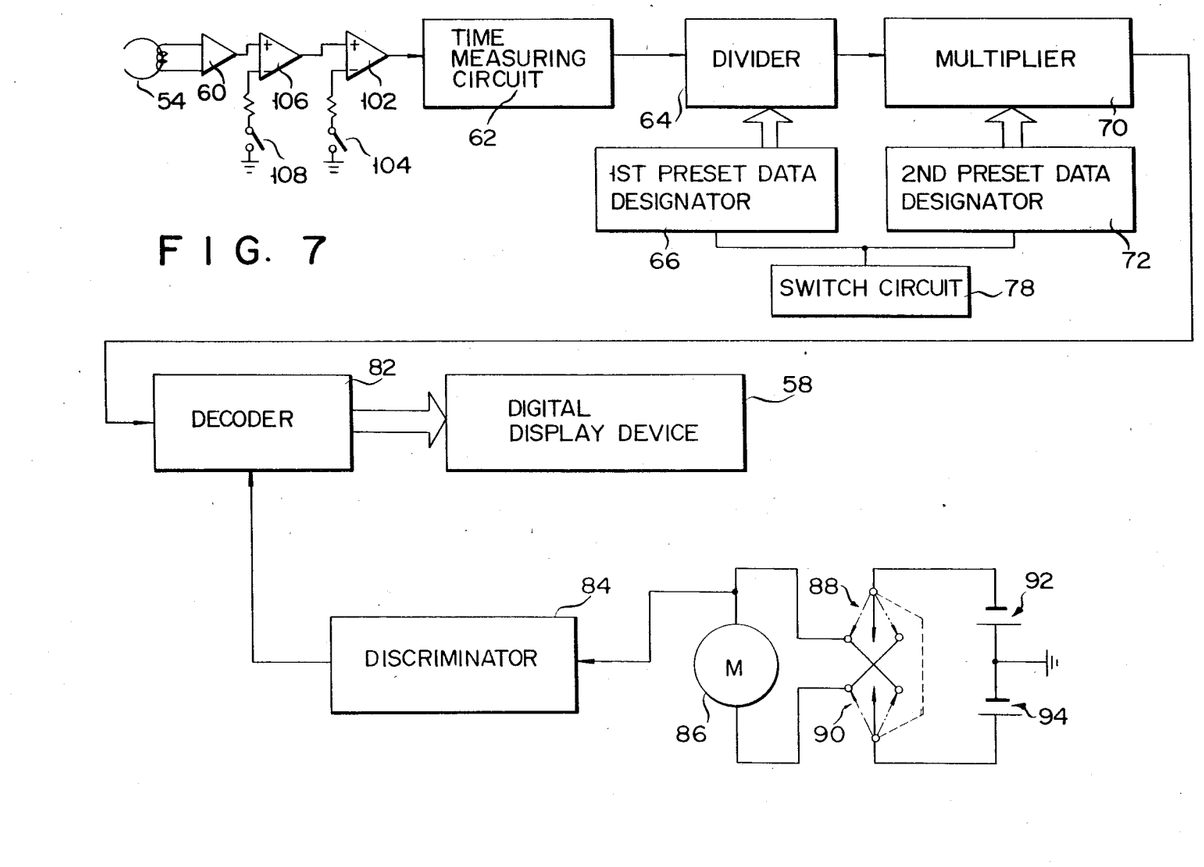
FIG. 7 is a block diagram showing the second embodiment of the word line number count/display device according to the invention.

As shown in FIG. 7, in the word line count/display device of the second embodiment, the amplifier 60 which is coupled to the other magnetic head 54 which works as detecting means is connected to a first comparator 102.

As shown in FIG. 7, the first comparator 102 includes an on-off switch 104. The on-off switch 104 is disposed on top of the tape recorder 10, as shown in FIG. 6.

When the on-off switch 104 is turned on, the first comparator 102 transmits only an electric detection signal corresponding to the second cue signal and produced from the amplifier 60, to the time measuring circuit 62. An electric detection signal corresponding to the third cue signal and produced from the amplifier 60 is not transmitted from the first comparator 102 to the time measuring circuit 62.

In the word line number count/display device in the second embodiment, the first comparator 102 is electrically connected to a second comparator 106, as shown in FIG. 7.

As shown in FIG. 7, the second comparator 106 includes an on-off switch 108. The on-off switch 108 is disposed on top of the tape recorder 10, shown in FIG. 6.

When the on-off switch 108 is turned on, the second comparator 106 transmits only an electric detection signal corresponding to the third cue signal and produced from the amplifier 60 to the time measuring circuit 62, and no electric detection signal corresponding to the second cue signal and produced from the amplifier 60 is transmitted from the second comparator 106 to the time measuring circuit 62.

The word line number count/display device according to the second embodiment operates in the same way as the word line number count/display device according to the first embodiment when the main communication contents "A, B, C, D" regarding the first to fourth letters are reproduced while the magnetic recording tape 26 is running in the direction of arrow F.FF or REW in FIG. 2, without interruption of the supply of electricity to the tape recorder 10.

Also, with the word line number count/display device according to the second embodiment, when the supply of electricity to the tape recorder 10 is interrupted during playback of one of the first to fourth main communication contents "A, B, C, D", for instance the first main communication content "A", while the magnetic recording tape 26 is running in the direction of arrow F.FF in FIG. 2, as soon as the supply of electricity to the tape recorder 10 is resumed, the on-off switch 104 of the first comparator 102 is turned on.

With the on-off switch 104 of the first comparator 102 turned on, when the third cue signal "b" is first detected by the second magnetic head 54 after resumption of the supply of electricity to the tape recorder 10, no electric signal corresponding to the third cue signal "b" is transmitted to the time measuring circuit 62.

As soon as the second cue signal "c" is detected by the second magnetic head 54 after the resumption of the supply of electricity to the tape recorder 10, the on-off switch 104 of the first comparator 102 is turned off.

Subsequently, the second and third cue signals "d, e, f, g, h" corresponding to the second to fourth main communication contents "B, C, D" are detected from the magnetic recording tape 26 running in the direction shown by arrow F.FF in FIG. 2 by the other magnetic head 54 of the multi-channel magnetic head 52. Thus, the word lines corresponding to the second to fourth main communication contents "B, C, D" are counted, and the counted word line numbers are displayed on the digital display device 58 in the manner as described above.

Further, with the word line number count/display device of the second embodiment, in the case when the supply of electricity to the tape recorder 10 is interrupted during playback of one of the fourth to first letters main communication contents "D, C, B, A", for instance the fourth letter main communication content "D", while the magnetic recording tape 26 is running in the direction of arrow REW in FIG. 2, the on-off switch 108 of the second comparator 106 is turned on as soon as the supply of electricity to the tape recorder 106 is resumed.

With the on-off switch 108 of the second comparator 106 turned on, when the second cue signal "g" is first detected by the second magnetic head 54 after the resumption of the supply of electricity to the tape recorder 10, no electric detection signal corresponding to the second cue signal "g" is transmitted.

As soon as the third cue signal "f" is detected for the second time by the second magnetic head 54 after the resumption of the supply of electricity to the tape recorder 10, the on-off switch 108 of the second comparator 106 is turned off.

Subsequently, the third and second cue signals "e, d, c, b, a" corresponding to the third to first main communication contents "C, B, A" are detected from the magnetic recording tape 26 running in the direction of arrow REW in FIG. 2 by the other magnetic head 54 of the multi-channel magnetic head 52. The word lines corresponding to the third to first main communication contents "C, B, A" are thus counted, and the counted word line numbers are displayed on the digital display device 58 in the manner as described before.

The above embodiment is given for the purpose of illustration only and is by no means limitative, and various changes and modifications in technical details can be made without departing from the scope and spirit of the invention.

With such arrangement, when the word lines of the plurality of main communication contents recorded on the magnetic recording tape moved in the other direction are counted and displayed, the counted word lines corresponding to the plurality of main communication contents may be displayed in such order that the plurality of main communication contents recorded on the tape moved in the one direction is counted and displayed.

What is claimed is:

1. In a tape recorder for dictation, which includes a multi-channel magnetic head having a plurality of magnetic heads, drive means for running a magnetic recording tape in a selected one of a first direction and a second direction opposite to said first direction, and first recording means connected to one of the magnetic heads in said multi-channel magnetic head, for recording a first signal including a main communication content of a dictation and a message regarding the main communication content on the magnetic recording tape when the magnetic recording tape is run in said first direction, a word line number count/display device comprising:
second recording means connected to another one of the magnetic heads in said multi-channel magnetic head, for recording a second signal related to the length of said main communication content on the magnetic recording tape;
detecting means for detecting said second signal from the magnetic recording tape while the magnetic recording tape is running in either of said first or said second directions;
calculating means electrically connected to said detecting means for calculating the number of word lines corresponding to the main communication content on the basis of said second signal and in accordance with an average number of words spoken by a dictator during a predetermined period of time and an average number of words contained in one line of a typing paper; and
display means electrically connected to said calculating means for displaying information corresponding to the calculated number of word lines.

2. The word line number count/display device according to claim 1, wherein said second signal related to the length of said main communication content on the magnetic recording tape comprises a continuous cue signal having a duration the same as the length of said main communication content on said magnetic recording tape, said continuous cue signal being recorded at the same time as said main communication content is being recorded.

3. The word line number count/display device according to claim 2, wherein:
said detecting means is arranged to generate a detection signal corresponding to the length of the main communication content;
said calculating means includes time measuring circuit means electrically connected to the detecting means, for measuring the time length corresponding to the length of said main communication content in response to said detection signal, and for generating a time period signal corresponding to the measured time length, dividing circuit means electrically connected to said time measuring circuit means, for dividing the time period signal from the time measuring circuit means by a predetermined reference value corresponding to a predetermined period of time to produce a quotient signal corresponding to a quotient of division, multiplying circuit means electrically connected to the dividing circuit means, for multiplying the quotient signal from the dividing circuit means by a predetermined value obtained by dividing the average number of words spoken by a dictator during a predetermined period of time by the average number of words contained in one line of a typing paper, to produce a product signal corresponding to the product of the multiplication, and a decoder electrically connected to the multiplying circuit means, for producing a digital signal corresponding to the product signal from the multiplying circuit means; and
said display means is electrically connected to said decoder, for displaying digital information corresponding to said digital signal.

4. The word line number count/display device according to claim 3, wherein said multiplying circuit means includes setting means for setting said average number of words spoken by a dictator during a predetermined period of time and for setting said average number of words contained in one line of a typing paper.

5. The word line number count/display device according to claim 3, wherein said decoder includes permutation circuit means electrically connected to said digital display means, for causing the display of said digital information on said digital display means in a predetermined order conforming to the order of arrival of the information at the digital display means from said decoder when said magnetic recording tape is moved in said one direction, and also causing the display of said digital information on said digital display means in the order converse to said predetermined order conforming to the order of arrival of the information at the digital display means from the decoder when said magnetic recording tape is moved in said other direction.

6. The word line number count/display device according to claim 2, wherein said detecting means includes a magnetic head.

7. The word line number count/display device according to claim 6, wherein said dividing circuit means includes reference value setting means for setting said predetermined reference value corresponding to said predetermined period of time.

8. The word line number count/display device according to claim 7, wherein said predetermined reference value as denominator of division in said dividing circuit means is one minute.

9. The word line number count/display device according to claim 7, wherein said multiplying circuit means includes setting means for setting said average number of words spoken by a dictator in said predetermined period of time and for setting said average number of words contained in one line of typing paper.

10. The word line number count/display device according to claim 9, wherein said predetermined reference value as denominator of division in said dividing circuit means is one minute.

* * * * *